US006915212B2

(12) United States Patent
Kamps

(10) Patent No.: US 6,915,212 B2
(45) Date of Patent: Jul. 5, 2005

(54) SYSTEMS AND METHODS FOR PROCESSING COMPLEX DATA SETS

(75) Inventor: Bill Kamps, Houston, TX (US)

(73) Assignee: Moac, LLC, Denver, CO (US)

( * ) Notice: Subject to any disclaimer, the term of this patent is extended or adjusted under 35 U.S.C. 154(b) by 0 days.

(21) Appl. No.: 10/434,723

(22) Filed: May 8, 2003

(65) Prior Publication Data

US 2004/0225443 A1 Nov. 11, 2004

(51) Int. Cl.⁷ .............................................. G01V 1/28
(52) U.S. Cl. ................................................... 702/14
(58) Field of Search ...................... 702/2, 5, 14, 16, 702/17, 18

(56) References Cited

U.S. PATENT DOCUMENTS

| | | | |
|---|---|---|---|
| 4,286,319 A | | 8/1981 | Membrino et al. |
| 4,351,025 A | | 9/1982 | Hall, Jr. |
| 4,414,624 A | | 11/1983 | Summer, Jr. et al. |
| 4,816,993 A | | 3/1989 | Takahashi et al. |
| 5,025,369 A | | 6/1991 | Schwartz |
| 5,198,979 A | | 3/1993 | Moorhead et al. |
| 5,307,496 A | | 4/1994 | Ichinose et al. |
| 5,361,373 A | | 11/1994 | Gilson |
| 5,404,296 A | | 4/1995 | Moorhead |
| 5,428,783 A | | 6/1995 | Lake |
| 5,430,734 A | | 7/1995 | Gilson |
| 5,537,319 A | | 7/1996 | Schoen |
| 5,550,787 A | | 8/1996 | Rialan et al. |
| 5,600,845 A | | 2/1997 | Gilson |
| 5,652,717 A | * | 7/1997 | Miller et al. .................. 703/6 |
| 5,657,223 A | | 8/1997 | Juszczak et al. |
| 5,734,829 A | | 3/1998 | Robinson |
| 5,873,049 A | * | 2/1999 | Bielak et al. .................. 702/6 |
| 5,893,091 A | * | 4/1999 | Hunt et al. .................... 707/3 |
| 5,920,828 A | * | 7/1999 | Norris et al. ................. 702/14 |
| 5,944,779 A | | 8/1999 | Blum |

(Continued)

OTHER PUBLICATIONS

Fithian, W. et al. "Iterative Matrix Equation Solver for a Reconfigurable FPGA–Based Hypercomputer®" Star Bridge Systems, Inc., Sep. 5, 2002, 14 pages.
Singleterry, R. et al. "Field–Programmable Gate Array Computer in Structural Analysis: An Initial Exploration", American Institute of Aeronautics and Astronautics, Paper No. AIAA–2002–1761, 11 pages.
Jeno Gazdag et al., *Concurrent Computing by Sequential Staging of Tasks*, IBM Systems Journal, Dec. 1989, v. 28, n. 4, p646 (Abstract) (1 page).
Jaikumar Vijayan. *Users Tune Out Buzz Over 64–bit Unix.* Computerworld. Feb. 17, 1997, v. 31, n. 7, p. 10 (Abstract) (2 pages).
Marianne Kolbasuk McGee, *Mobil Leaves Cray for Parallel Universe, Information Week*, Oct. 11, 1993, n. 446, p. 62, (2 pages).
Philip Hunter, *Shell's Seismic Linux, Computer Weekly*, Jun. 7, 2001, (Full Text: 2001 Reed Elsevier Business Publishing, Ltd., UK,) (6 pages).

(Continued)

Primary Examiner—Donald McElheny, Jr.
(74) Attorney, Agent, or Firm—Marsh Fischmann & Breyfogle LLP

(57) ABSTRACT

Various systems and methods of the present invention provide for distributing access to a dataset to a plurality of processing nodes where the dataset is processed to produce node specific outputs. Distribution can be accomplished by a chain, or star-chain distribution model. Some systems and methods of the present invention provide for check-pointing and restarting improperly terminated processes. Other systems and methods provide for computing a coherent result using a cluster of heterogeneous nodes.

62 Claims, 9 Drawing Sheets

U.S. PATENT DOCUMENTS

| | | | | |
|---|---|---|---|---|
| 5,987,125 A | * | 11/1999 | Stringer et al. | 713/150 |
| 5,991,695 A | | 11/1999 | Wang et al. | |
| 5,995,904 A | | 11/1999 | Willen et al. | |
| 6,023,223 A | * | 2/2000 | Baxter, Jr. | 340/531 |
| 6,032,172 A | * | 2/2000 | Kutcher | 718/102 |
| 6,049,759 A | | 4/2000 | Etgen | |
| 6,061,730 A | | 5/2000 | Billings | |
| 6,078,321 A | * | 6/2000 | Simonoff et al. | 345/744 |
| 6,112,225 A | | 8/2000 | Kraft et al. | |
| 6,115,764 A | | 9/2000 | Chisholm et al. | |
| 6,125,329 A | * | 9/2000 | Place et al. | 702/5 |
| 6,134,599 A | | 10/2000 | Chiu et al. | |
| 6,216,169 B1 | * | 4/2001 | Booman et al. | 709/246 |
| 6,304,916 B1 | | 10/2001 | Iwatsuki et al. | |
| 6,330,583 B1 | | 12/2001 | Reiffin | |
| 6,446,007 B1 | | 9/2002 | Finn et al. | |
| 6,446,069 B1 | * | 9/2002 | Yaung et al. | 707/9 |
| 6,496,969 B2 | | 12/2002 | Feng et al. | |
| 6,535,940 B1 | | 3/2003 | Liu et al. | |
| 6,751,553 B2 | * | 6/2004 | Young et al. | 702/5 |
| 2002/0062218 A1 | * | 5/2002 | Pianin | 705/1 |
| 2003/0023576 A1 | | 1/2003 | Gilson | |
| 2003/0028590 A1 | | 2/2003 | Gonzalez et al. | |
| 2003/0115096 A1 | | 6/2003 | Gilson | |

OTHER PUBLICATIONS

Petros Kofakis et al., *Distributed Parallel Implementation of Seismic Algorithms*, Proceedings of SPIE—The International Society for Optical Engineering, vol. 2571, 1995, pp. 229–238.

T. Bohlen, *Parallel 3D Viscoelastic Finite Difference Seismic Modeling*, Computers & Geosciences, vol. 26, No. 6, Oct. 2002, pp. 887–899 (Publisher: Elsevier, UK) (Abstract) (1 page).

R. E. Ewing et al., *Distributed Computation of Wave Propogation Models Using PVM*, IEEE Parallel & Distributed Technology, vol. 2, No. 1, Spring 1994, ppl. 26–31, (Abstract) (1 page).

Vikramaditya Sen et al., *PVM Based 3–D Kirchhoff Depth Migration Using Dynamically Computed Travel–Times: An Application in Seismic Data Processing*, Parallel Computing, vol. 25, No. 3, Mar. 1999, pp. 231–248.

C. Niccanna et al., *The Use of a Parallel Virtual Machine (PVM) for Finite–difference Wave Simulations*, Computers & Geosciences, vol. 23, No. 7, Auyg. 1997, pp. 771–783, (Abstract) (1 page).

C. Niccanna et al., *Larger Grids and Shorter Wall–clock Times on a Parallel Virtual Machine (PVM)—and Example Using a Finite Difference Wave Simulation Algorithm*, Geo-Computation 96—1st International Conference on Geo-Computation, Univ. Leeds, Part vol. 2, 1996, pp. 661–662, (Abstract) (1 page).

A. Villarreal et al., *Distributed Three–dimensional Finite–Difference Modeling of Wave Propogation In Acoustic Media*, Computers in Physics, vol. 11, No. 4, Jul.–Aug., 1997, pp. 388–399, (Abstract) (1 page).

P. Hoogerbrugge et al., *Experiences With Networked Parallel Computing*, Concurrency Practice & Experience, vol. 7, No. 1, Feb. 1995 pp. 1–16. UK. (Abstract) (1 page).

K. Stammler, *SeismicHandler–programmable Multichannel Data Handler for Interactive and Automatic Processing of Seismological Analyses*, Computers & GeoSciences, vol. 19, No. 2, Feb. 1993, pp. 135–140. UK. (Abstract) (1 page).

Y. Shimshoni et al., *Classification of Seismic Signals by Integrating Ensembles of Neural Networks*, IEEE Transactions on Signal Processing, vol. 46, No. 5, May 1998, pp. 1194–1201. (Abstract) (1 page).

D. Barraez et al., *Modular Neural Networks for Seismic Tomography*, Proceedings 16th International Conference on Patteren Recognition, IEEE Comput. Soc., Part vol. 3, 2002, pp. 407–410. (Abstract) (1 page).

Yuzuru Ashida, *Data Processing of Reflection Seismic Data by Use of Neural Network*, Journal of Applied Geophysics, vol. 35, No. 2–3, pp. 89–98, Oct. 1996, (Abstract) (1 page).

*PGS Debuts Seismic Processing System for UNIX/LINUX*, (Cube Manager 2.50 Product Announcement), Communications of the ACM, Oct. 2000, V. 43i10 p. 55 (1 page).

*A Hierarchical Framework for Parallel Seismic Applications*, Association for Computing Machinery, Inc., Communications of the ACM, Oct. 2000, V. 43 it0 (6 pages).

* cited by examiner

SYSTEMS AND METHODS FOR PROCESSING COMPLEX DATA SETS

BACKGROUND OF THE INVENTION

The present invention relates to computational processing. More particularly, the present invention provides systems and methods for distributing a dataset to a plurality of nodes, which in turn produce node specific outputs from the dataset. As just one example, the dataset can be a group of seismic data that is processed by a plurality of nodes to form a three-dimensional image of a geologic formation. Other data sets, however, can be used.

The seismic processing industry is involved in processing large amounts of seismic data using very complex algorithms. This is especially true for imaging algorithms that use the majority of the compute power in this industry. Such processing has historically involved the use of expensive supercomputers, or high end workstations. As an example, the amounts of data involved and the complexity of the algorithms often requires weeks of processing time to create an image of a geologic structure. To reduce processing costs, the seismic processing industry has been experimenting with the use of low cost computers as its main processing engines. To control the time required to complete a processing job, clusters of such computers have been proposed. As one example, a number of dual-processor personal computers serving as compute nodes each can be connected to a data server in a star configuration.

The advantage of such a cluster is its low cost, and its scalable, high compute capacity. However, the interconnect between the data server and the various nodes is often a bottleneck limiting the compute capacity of such a cluster. The problems associated with this bottleneck increase as the size of a cluster increases. As one example, a cluster may exceed one thousand nodes. One solution is to split a dataset and to provide multiple servers that each provide access to at least a portion of the dataset via an elaborate switch configuration. Such an approach requires relatively expensive switch hardware, and implementation of a complex data location monitoring scheme to assure data coherency and to identify which server supplies which portion of a given dataset. Another solution is to simply increase the bandwidth of a network switch coupling a data server to a surrounding cluster of computer nodes. Such an approach significantly increases the cost of the switch, and ultimately results in the same bottleneck where the number of nodes is increased.

Additionally, imaging software used by the seismic processing industry typically utilizes some middleware, like Message Passing Interface (MPI), Parallel Virtual Machine (PVM), or Beowulf. These software tools require that each computer node in a cluster run exactly the same imaging executable. This can mean that the compute nodes must all be running the same operating system, and the same version of the middleware. A seismic processing company may thus be forced to purchase specific computers and software in an effort to create a homogeneous cluster. This inhibits the company's ability to upgrade and/or to select computers offering the best value.

Yet further, a number of seismic imaging applications utilize the Network File System (NFS) to deliver the data from the data server to the cluster nodes. NFS has the advantage to the software developer in that it makes file systems on the server appear to be local to the compute nodes. This reduces the programming effort needed to message pass the data within the application. However, NFS has two large disadvantages. The first is that it uses the network very inefficiently and puts a large load on the data server. This reduces the ability of the data server to deliver data to the cluster nodes. The second problem is that NFS is unstable. NFS links from one computer to the next and can "hang", or fail to respond. This can cause jobs running on the cluster to fail. The probability of this occurring increases rapidly as the number of compute nodes increases. As imaging jobs can run for several weeks before completing, any failure can result in the loss of considerable time and effort.

Thus, there exists a need in the art to provide advanced systems and methods for computational processing. As will be appreciated from the following disclosure, the systems and methods according to the present invention address these, and a number of other problems related to processing.

BRIEF SUMMARY OF THE INVENTION

The present invention provides systems and methods for distributing a dataset to a plurality of nodes, which in turn produce node specific outputs from the dataset. Such an invention finds applicability to a broad array of problems including, but not limited to, imaging. As one example, a set of seismic data can be processed by a number of nodes to create a group of node specific outputs. The node specific outputs can then be combined to form a three-dimensional image of a geologic formation. Other examples of datasets that can be processed in accordance with the present invention include, but are not limited to geophysical data, astrological data, electromagnetic data, and the like.

Some aspects of the invention provide for distributing access to a dataset. Such distribution can be accomplished by a chain, or star-chain distribution model. Other aspects of the invention provide for computational check-pointing and automatic restart capability, while additional aspects provide for computing a coherent result using a cluster of heterogeneous nodes.

Some embodiments of the present invention provide a processing cluster. The processing cluster includes a database with a dataset stored thereon. The database is accessible to a first node that is capable of distributing the dataset to a second node. The second node is capable of distributing the dataset to a third node. Thus, service to the dataset can be provided by a number of nodes in such a way that no single node is overwhelmed. In some cases, this is done through use of the same nodes allocated for computational use. Thus, the distribution can be accomplished without requiring additional hardware. While the approach is described in relation to three nodes, it can be applied to any number of nodes to which a dataset is to be distributed.

In particular aspects of the embodiments, the nodes are communicably coupled via a network switch. Where the nodes are communicably coupled via a network switch, distribution according to the present invention can reduce traffic on an overburdened port of the network switch by shifting the burden to other ports. Again, this can be done using nodes and related network connectivity allocated for computational activities. In some cases, the third node is also communicably coupled to the first node via the network switch. As one example, such an approach provides an ability to transfer minimal control data directly from the first node to the third node, while transferring the higher bandwidth intensive dataset from the second node to the third node.

Other aspects of the embodiments provide for serving multiple chains of nodes from a central node using a star-chain methodology. In such cases, a data set can be segmented into two or more sections, with each section being distributed across a chain of nodes. In some cases, the segmentation is performed such that the cross-over between the data sections is minimal. Thus, using the example of geologic imaging, a data set having data relevant to two regions can be segregated into a first section and a second section where each section contains data relevant to one of the respective regions. Two chains of nodes are then used to compute the image of a respective region assigned to the particular chain of nodes.

Various of the embodiments further include a computer readable medium that includes computer executable instructions, or software, stored thereon. Such a computer readable medium can be the previously described database, or another medium, such as a hard-drive and/or a RAM maintained local to one or more of the nodes. Yet further, the computer readable medium can be a portable medium, such as a diskette, CD-ROM, DVD, ZIP drive cartridge, tape, or the like that can be read by one or more of the nodes. A number of different computer executable instructions can be included on the computer readable medium. For example, the instructions can include instructions executable by the first node to determine if the second node and/or third node terminate properly. Such instructions can be used to monitor completed processing, and if necessary, to restart such processing where it is found that the termination was for some reason improper. In some cases similar but more general instructions can be executable by any node in a chain of nodes to determine whether a neighbor node has terminated properly.

Yet further instructions can provide a check-pointing function whereby a node writes a variety of interim results that occur during the computation of an end result. Instructions can thus be provided to identify a recent valid checkpoint, and to restart a node at that checkpoint where an improper termination is detected. This can be useful in complex processing scenarios where it is not uncommon for a non-recurring failure to occur before a final result is achieved. Additionally, such check-pointing can reduce time necessary to identify and resolve a recurring failure.

Other instructions can provide for data conversion to global types and/or local types. For example, the processing cluster may generally use a big endian format, while one or more individual nodes in the processing cluster use little endian format. A distributed dataset can be passed as big endian, or another chosen global type, and converted to little endian, or another chosen local type, for computational use on an individual node. Thus, the processing cluster can include a set of heterogeneous nodes. As used herein, a heterogeneous cluster is a mix of different computers, or a group of similar computers running different operating systems e.g., Solaris™, IRIX™, Linux™ or Windows™. Such a heterogeneous cluster can be comprised of, for example, one or more workstations grouped together with one or more personal computers, each acting as a node in the processing cluster. As another example, conversion can be used to accommodate a heterogeneous cluster of thirty-two bit and sixty-four bit nodes. As one skilled in the art will appreciate, the present invention can comprise any suitable computing workstation running any suitable operating system, and thus is not limited to the workstations and operating systems disclosed herein. Moreover, future developed workstations or computing devices and operating systems may be used.

Other embodiments of the present invention provide a seismic data imaging system. Such systems include a database with input trace data stored thereon, and a master node communicably coupled to a chain of two or more sub-nodes. At least one of the nodes within the chain is configured to receive the input trace data from a preceding sub-node. In some instances, the systems include two or more chains communicably coupled to a common central node.

Yet other embodiments of the present invention provide a computer readable medium with computer executable instructions incorporated thereon. Such computer executable instructions can provide for receiving input seismic data from an upstream node included within a chain of nodes communicably coupled to a master node, instructions to compute an image of a physical location based at least in part on the input seismic data, instructions for converting to/from local and global data types, instructions to receive job parameters, and/or instructions to transfer computed results to a master node.

Additional embodiments provide a computer readable medium, again with computer executable instructions. The computer executable instructions can provide for accessing an output trace file that identifies a plurality of output traces to be computed, accessing a node file that includes one or more attributes about each node in a chain of nodes, and assigning each of the plurality of output traces to a node in the chain of nodes. The assignment can be tailored to balance the use of nodes in a cluster, or to minimize or maximize use of particular nodes in a cluster. For example, such instructions can be used to balance a computational job. Thus, a node with considerably more processing power than another node is assigned to compute either more output traces, or more complex output traces. In one particular case, a balanced time can be found where the estimated computation time required by any given node is not more than the aggregate time required by the two nodes requiring the shortest computational time. In other cases, a balanced time is found where no node finishes computation more than twenty percent faster than the node requiring the greatest computational time, while in yet other cases, balance time is found where all nodes finish at greater than ninety percent of the computation time required for the node requiring the greatest computational time.

Further instances include instructions to: determine a time required to compute an output trace selected from the plurality of output traces on a node selected from the chain of nodes; monitor computation of an output trace on an assigned node; identify a processing checkpoint of the assigned node; restart the assigned node at the processing checkpoint; and/or receive the computed output traces from the respective assigned nodes. In one particular instance, the computer readable instructions are operable to segregate a dataset into two or more sub-sets, and to assign the sub-sets to corresponding chains of nodes.

Yet further embodiments provide a method of computing that includes accessing a dataset; designating a plurality of nodes as a node chain comprising a first node, a second node, and a third node; transferring the dataset from the first node to the second node, and from the second node to the third node; processing the dataset on the first node to create a first output, on the second node to create a second output, and on the third node to create a third output; and assembling the first, second and third outputs to form a coherent output. In one particular case, the coherent output is an image of a geologic structure.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention provides systems and methods for distributing a dataset to a plurality of nodes, which in turn produce node specific outputs from the dataset. Such an invention finds applicability to a broad array of problems including, but not limited to, imaging. As one example, a set of seismic data can be processed by a number of nodes to create a group of node specific outputs. The node specific outputs can then be combined to form a three-dimensional image of a geologic formation. Other examples of datasets that can be processed in accordance with the present invention include, but are not limited to geophysical data, astrological data, electromagnetic data, and the like.

Some aspects of the invention provide for distributing access to a dataset. Such distribution can be accomplished by a chain, or star-chain distribution model. Other aspects of the invention provide for computational check-pointing and automatic restart capability, while additional aspects provide for computing a coherent result using a cluster of heterogeneous nodes.

Figure 1:
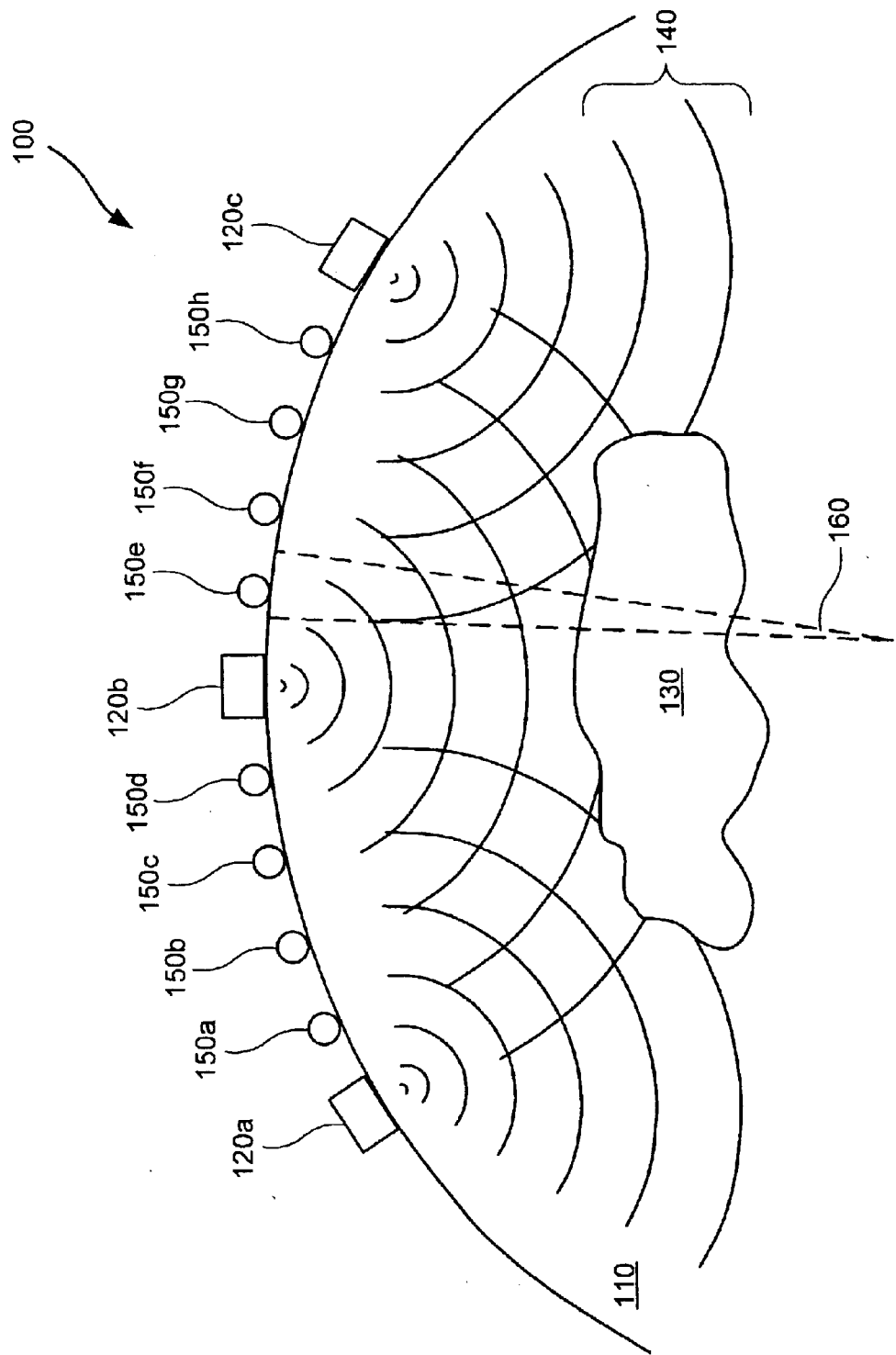
FIG. 1 is a simplified cross-sectional view of the Earth illustrating the placement of seismic sensors and a geologic structure to be measured.

While the invention can be applied to a number of computational scenarios, for illustration purposes it is described in relation to seismic imaging of geologic structures. Referring to FIG. 1, a simplified cross-sectional view 100 is provided of the Earth 110 illustrating the placement of seismic sensors 120 and a geologic structure 130 to be imaged. Seismic sensors 120 can be any sensor capable of producing measurement energy 140, and/or sensing such measurement energy 140 as it is reflected by structures internal to the Earth 110. One of ordinary skill in the art will recognize and understand a variety of such sensors. Also depicted are a number of measurement areas 150. Measurement areas 150 are locations on the surface of the Earth 110, or regions 160 that extend from the surface to a point below the surface. In operation, energy 140, such as sound waves, from one or more of sensors 120 is transmitted into the Earth 110, and reflections of those waves are detected by various of sensors 120. This geographically spaced sensor data is then processed or interpolated to determine an image corresponding to measurement areas 150 and regions 160. This processing or interpolating is referred to herein as seismic image processing. Further, the data received and/or measured at sensors 120 is referred to herein as seismic trace data, seismic data, and input trace data. The data generated from the input trace data for the various measured locations 150 is referred to herein as output trace data, or output image data.

Figure 2:
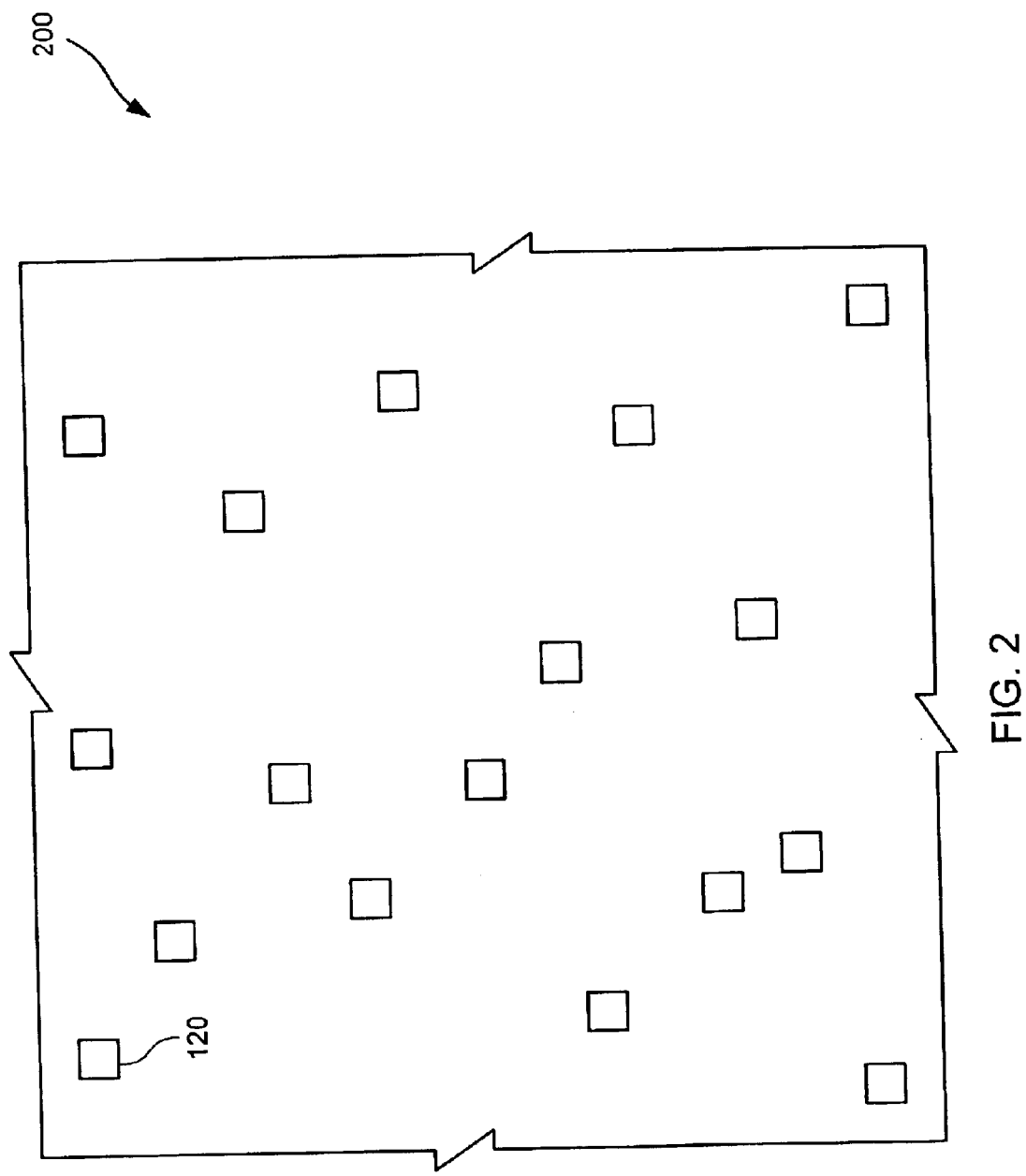
FIG. 2 is a two-dimensional top view of the placement of the seismic sensors of FIG. 1.

Referring to FIG. 2, a two-dimensional top view 200 depicting the relative physical location of seismic sensors 120 (illustrated as squares) across the surface of the Earth 110. Such sensors 120 can be placed at various locations across the Earth's surface. In some cases, sensors 120 are located within a few feet of another sensor, while in other cases, sensors 120 can be located miles or hundreds of miles from another sensor. For the purpose of the present description and invention, any number of sensors 120 can be used, and located at any location. The placement and use of sensors 120 is beyond the scope of the present disclosure. However, one of ordinary skill in the art will recognize how and where to place sensors 120.

Figure 3:
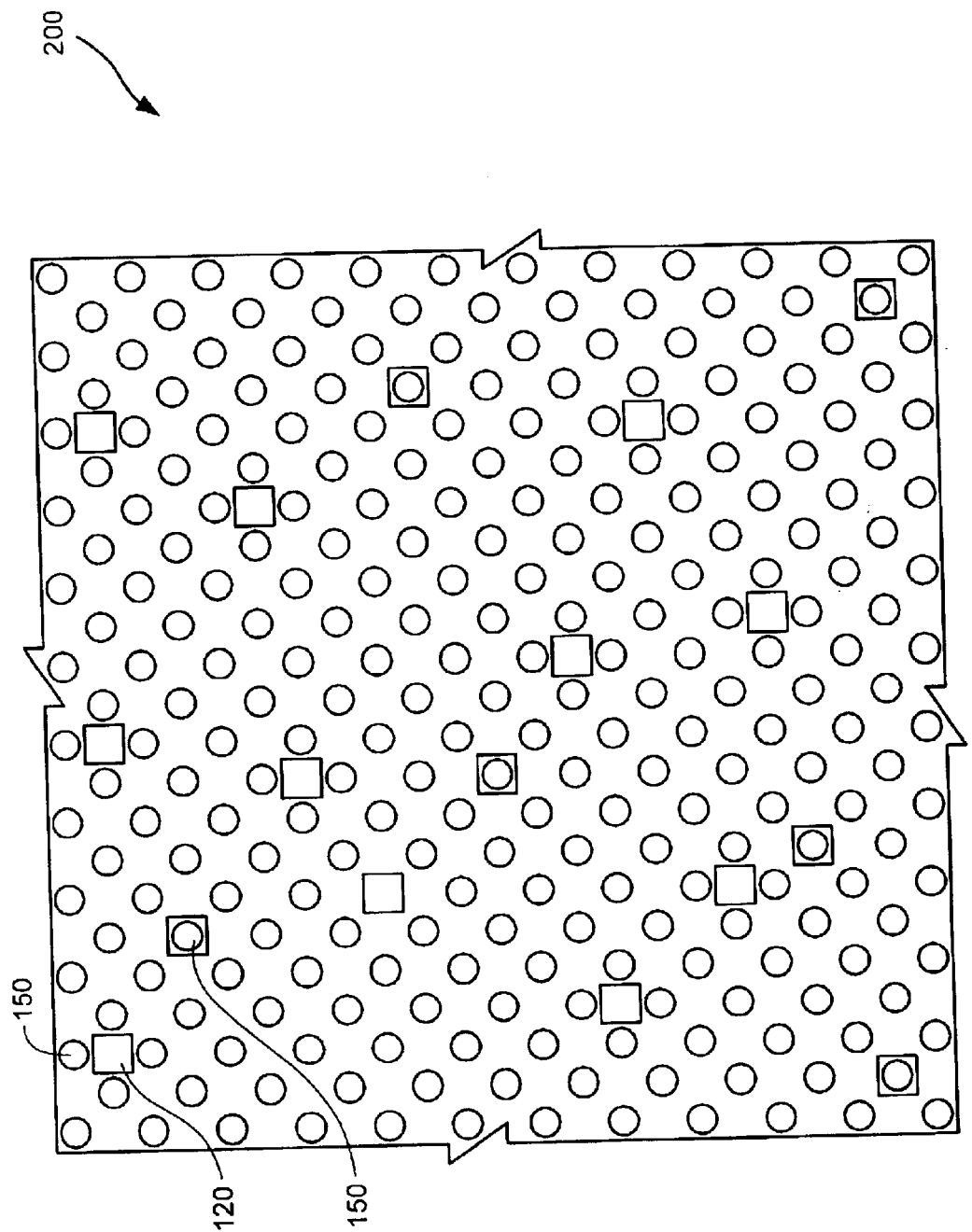
FIG. 3 is the two-dimensional top view of FIG. 2 with the addition of computation points in relation to the seismic sensors.

Turning to FIG. 3, view 200 of FIG. 2 is augmented with a number of measurement locations 150. Measurement locations 150 are physical regions for which an image, or output trace, is to be computed based on input traces obtained at various sensors 120.

Figure 4:
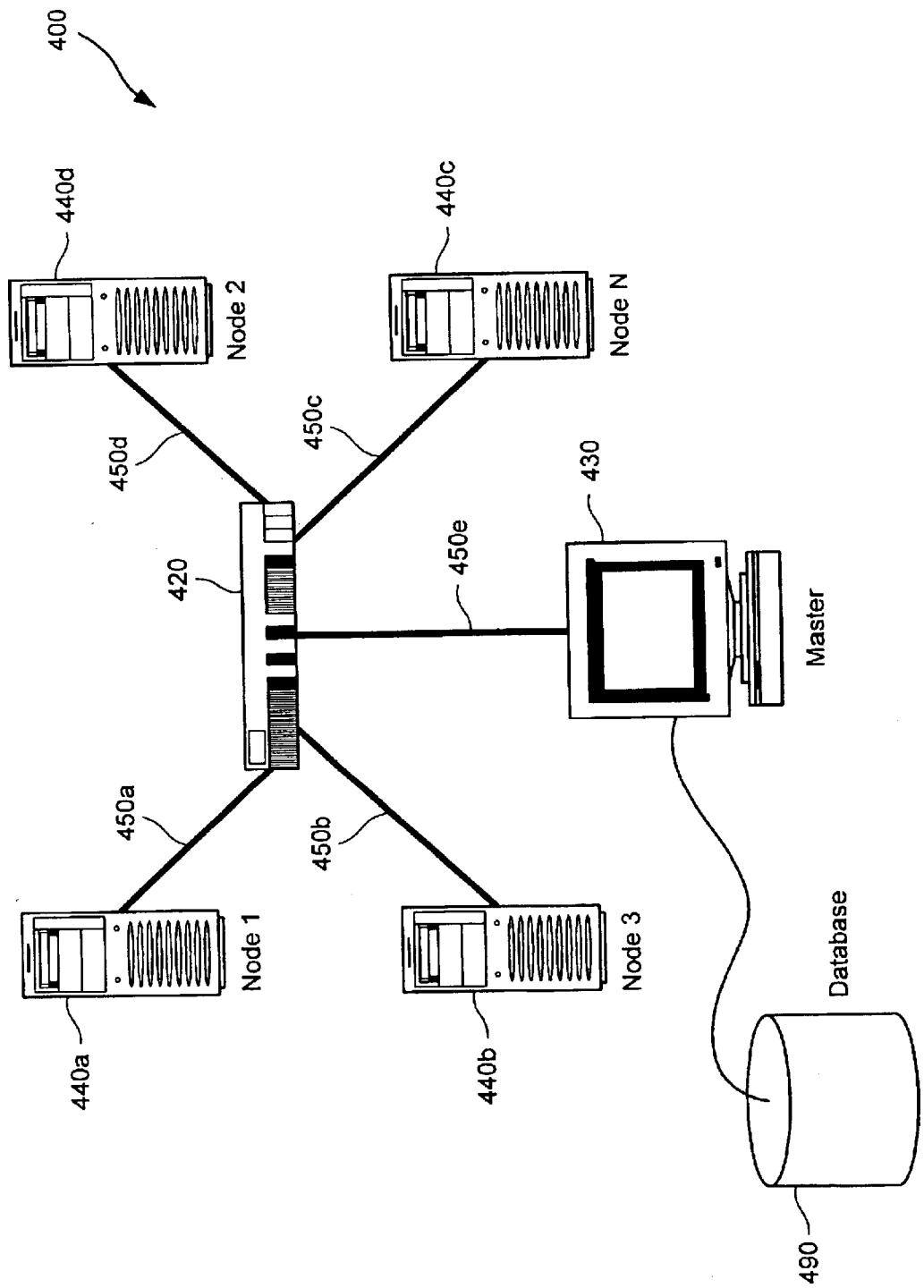
FIG. 4 illustrates the connectivity of a master node and four sub-nodes via a network switch.

Referring to FIG. 4, a connectivity diagram 400 illustrates physical connections 450 from a master node 430 and various sub-nodes 440 to a network switch 420. Nodes 430, 440 can be any microprocessor based machine capable of computational processing, and/or data serving. In some cases, master node 430 is a workstation, and sub-nodes 440 are personal computers. Based on the description provided herein, one of ordinary skill in the art will recognize other machines that can be used as nodes to effectuate the principles of the present invention. Further, master node 430 is connected to a database 490, either directly or via network switch 420. Network switch 420 can be any network communication device capable of communicably coupling master node 430 to one or more sub-nodes 440. Various network switches are provided by, for example, Cisco Systems, Inc. As used herein, communicably coupled indicates that a path is provided whereby one node can communicate data to another node. In some cases, communicable coupling includes a wired path from one node to the network switch, then another wired path from the network switch to another node. In other cases, communicable coupling may include a direct wired path from one node to another node. In yet other cases, such communicable coupling can include a wireless path connecting one or more nodes to the network switch.

Figure 5:
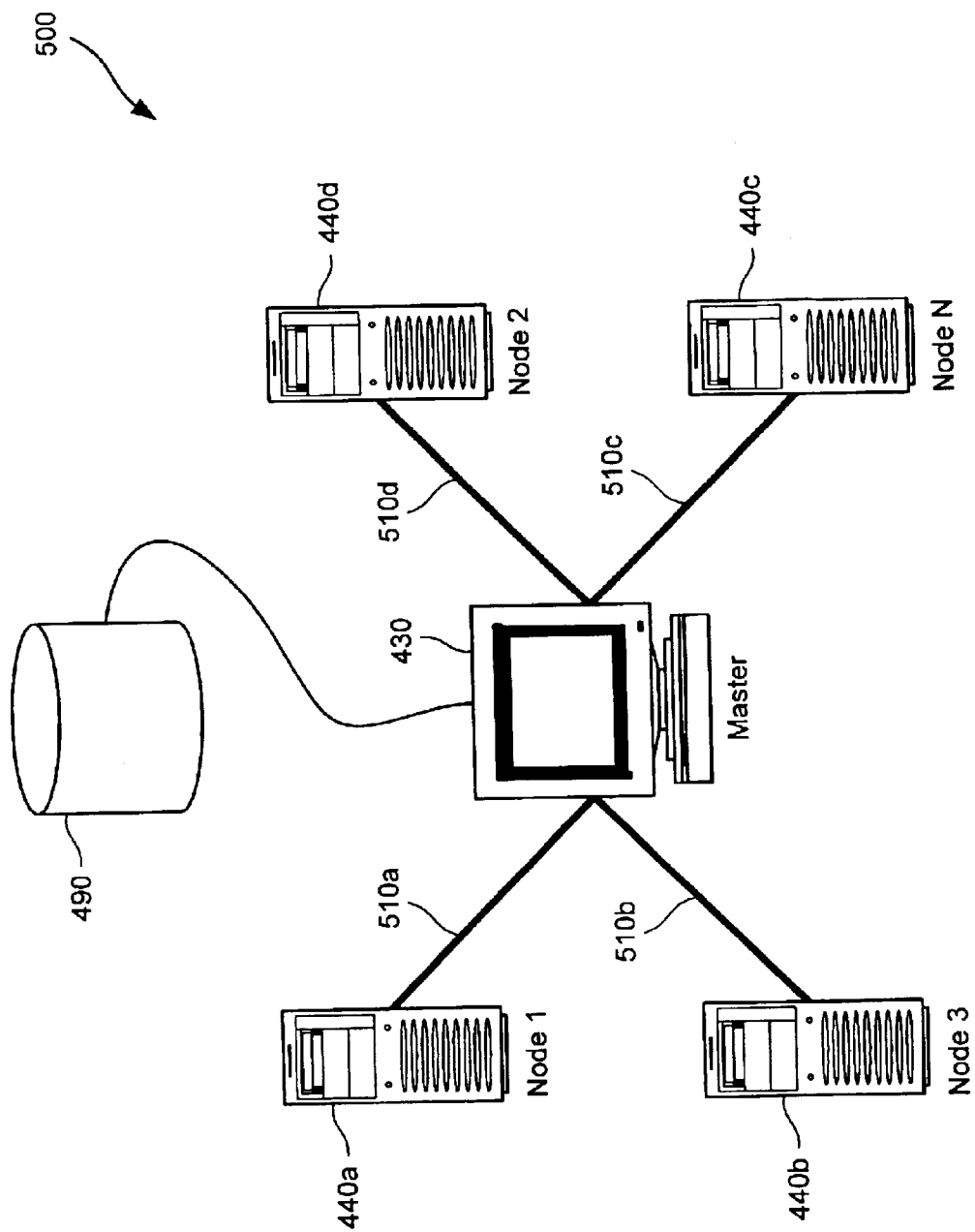
FIG. 5 illustrates a data flow model of the prior art where data is served from the master node to each of the sub-nodes.

Referring to FIG. 5, a data flow diagram 500 illustrates a data flow model of the prior art where data is accessed by master node 430 from database 490 and served directly (via logical paths 510) to each of sub-nodes 440. As previously discussed, such an approach creates a heavy burden on master node 430, as well as the physical connection or port of the network switch servicing master node 430.

Figure 6:
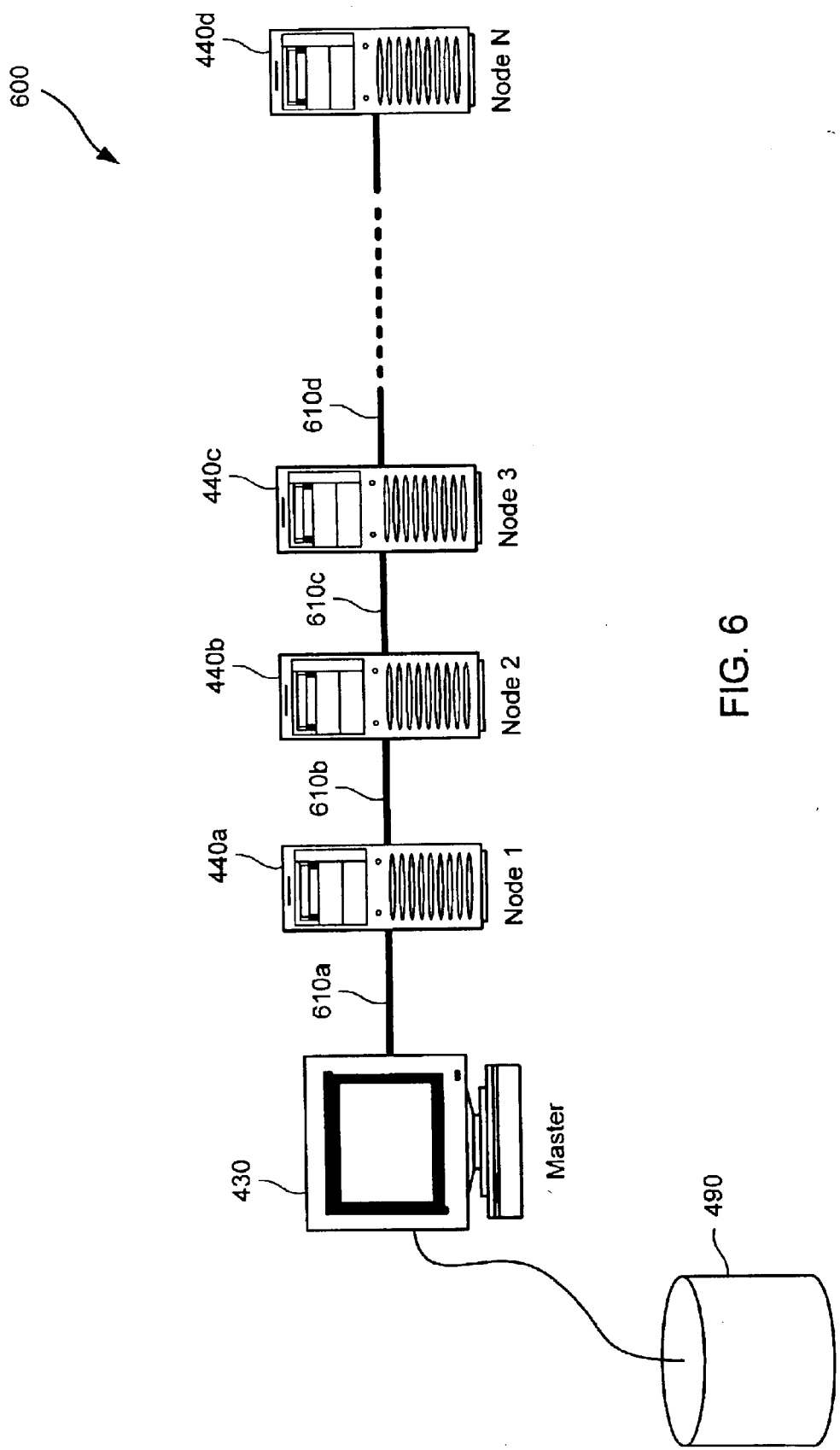
FIG. 6 illustrates a chain data flow method in accordance with embodiments of the present invention.

A data flow diagram 600 of FIG. 6 stands in stark contrast to the aforementioned. More particularly, data flow diagram 600 depicts a chain data flow model in accordance with embodiments of the present invention where data is accessed from database 490 by master node 430, and served to node 440a via a logical path 610a. Logical path 610a can be, for example, from master node 430 to a port on network switch 420, and from network switch 420 to node 440a. Data is served from node 440a to node 440b via a logical path 610b. Logical path 610b can be, for example, from node 440a to a port on network switch 420, and from network switch 420 to node 440b. Data is served from node 440b to node 440c via a logical path 610c. Logical path 610c can be, for example, from node 440b to a port on network switch 420, and from network switch 420 to node 440c. Data is served from node 440c to node 440d via a logical path 610d. Logical path 610d can be, for example, from node 440c to a port on network switch 420, and from network switch 420 to node 440d. As suggested by the dotted line of logical connection 610d, any number of nodes can be chained together. This chaining approach distributes the data transfer burden across the various ports of network switch 420, rather than focusing the burden on the port serving master node 430 as was the case with the prior art. In addition, master node 430 can be communicably connected to each of nodes 440, for example, via logical paths through switch 420.

Using a chain in accordance with one embodiments of the present invention, more than one thousand nodes can be served by a single data server connected via, for example, a simple 100 Mbit network, that can deliver about 7–8 Mbytes per second of data point to point. Faster networks, as they become available and economically viable, can be used. Software running on the chain determines and controls how the data is delivered to the various nodes in the chain.

As an example, the software application can be a seismic imaging application that uses each individual node in a chain to compute a measurement area 150 based on input trace data from sensors 120. The input trace data is maintained as a dataset on a database accessible by master node 430. The same input trace data is used by each of nodes 440 to compute the respective measurement areas 150 assigned thereto. Thus, to effectuate the computation of measurement areas 150, the input trace data is distributed to the first node in the chain, from there to a subsequent node and so on. The dataset is passed along the chain until each of nodes 440 receives a copy, or a portion thereof. There is little wasted effort in this topology, since all the compute nodes need to eventually receive most if not all the input trace data.

In some embodiments, master node 430 creates the chain by identifying the job to be performed and the number and type of nodes necessary to complete the job. Master node 430 then passes a job parameter file-to each of the identified nodes. For each node, the job parameter file identifies an upstream node and a downstream node. The upstream node is the node logically closest on the master node side of the data flow. The downstream node is the node logically closest and away from the master node side of the data flow. In some cases, this job parameter file is passed directly from master node 430 to a particular sub-node 440. Alternatively, in other cases, the job parameter file is passed indirectly down the node chain similar to the way the input trace dataset is passed.

Since currently there are scalability limits to various algorithms that may be operated on a particular processing cluster, in one embodiment a single chain probably should not scale beyond a few hundred nodes although it is possible. In such cases, it is possible to divide a job so that it runs effectively on multiple chains. Since master node 430 can feed an entire chain by supplying data to a single node 440, it is possible to maintain several chains and scale well beyond one thousand nodes supported by a single master node, using only a standard 100 Mbit network. Such an approach is referred to herein as a star-chain topology.

Figure 7:
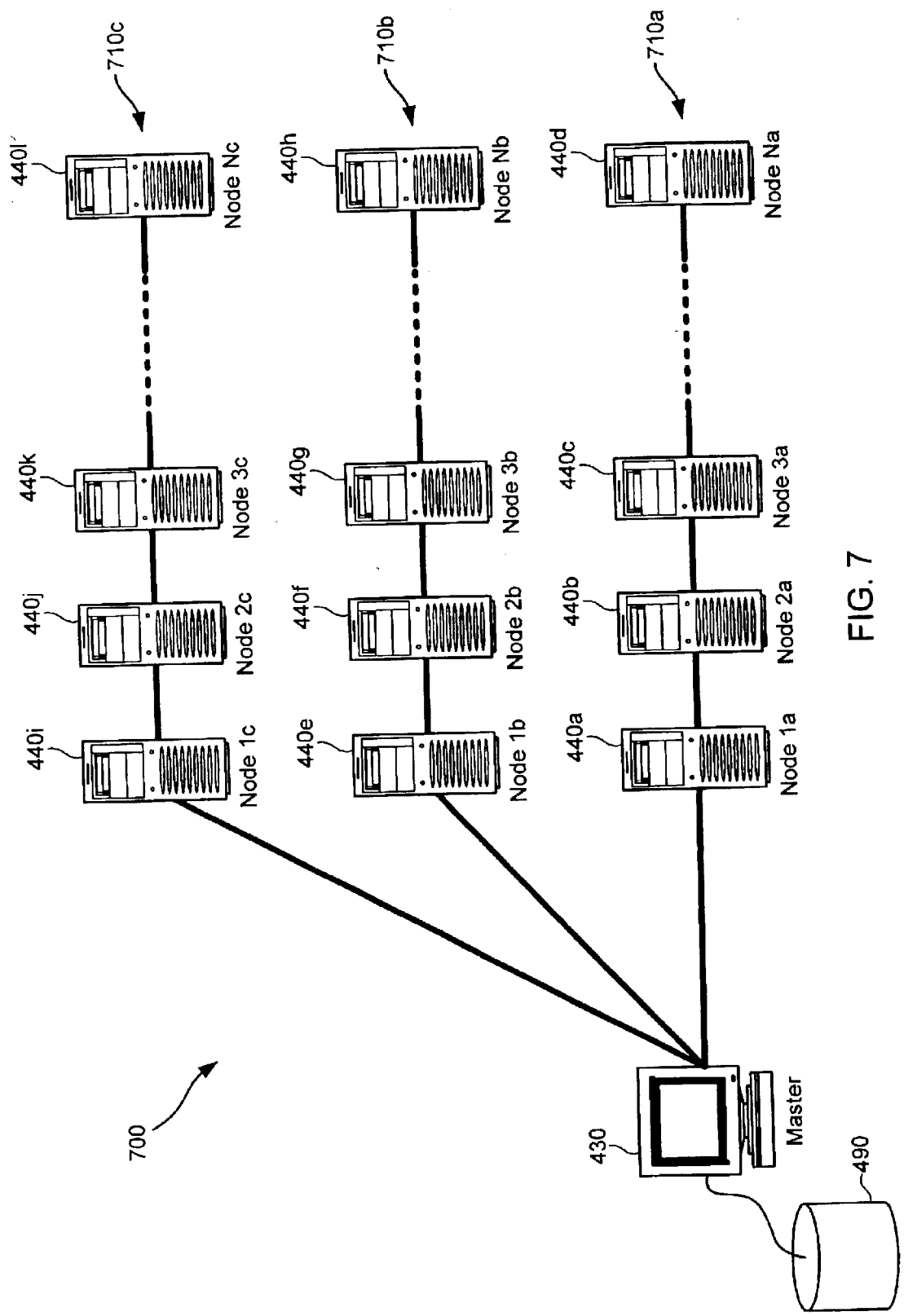
FIG. 7 illustrates a star-chain data flow model in accordance with other embodiments of the present invention.

Turning to FIG. 7, a star-chain topology 700 in accordance with various embodiments of the present invention is illustrated. Star-chain topology 700 includes a group of two or more chains 710 with a lead node 440a, 440e, 440i of each chain 710 in direct communication with master node 430. Dividing a job into multiple sub-jobs can be particularly advantageous when such a topology is allowed.

An example of such a job division will be discussed in relation to the seismic imaging application previously described. Computation of a particular output trace of a measurement location may not be impacted (or may only be marginally impacted) by input trace data from a distant sensor 120. Thus, a data set of input trace data can be segmented into two or more data sections where the data sections include input trace data that is relevant only to the computation of output trace data assigned to nodes within a particular chain of nodes. In this way, a number of data sections can be prepared with a chain of nodes identified and assigned to process a particular data section. Thus, for example, star-chain topology 700 would be assigned three data sections, with each of the data sections being processed by a particular chain 710 of nodes.

Figure 8:
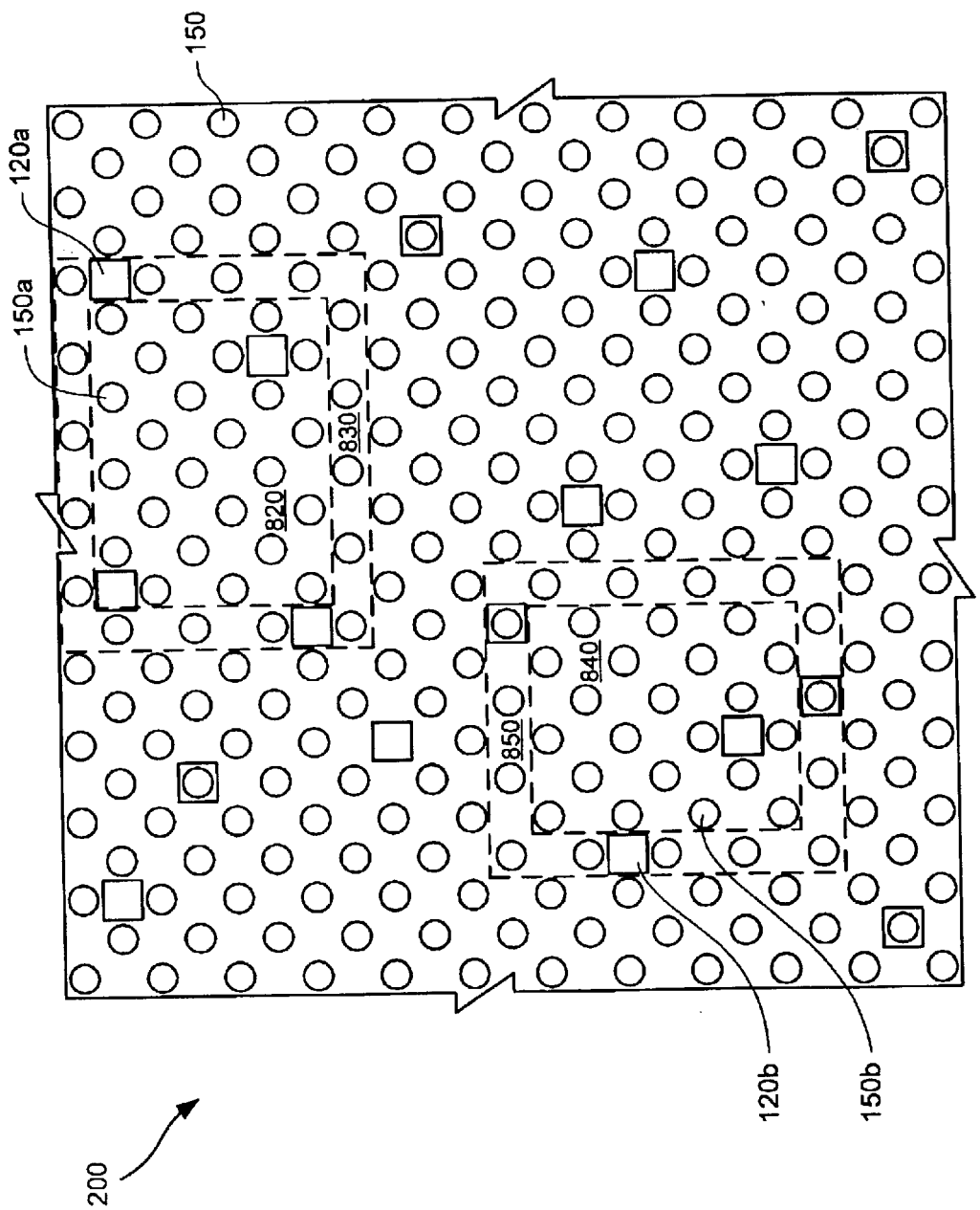
FIG. 8 illustrates segmenting of data points illustrated in FIG. 3, and useful in relation to the star-chain data flow model of FIG. 7.

Turning to FIG. 8, an example of segregating or dividing a dataset for processing on separate chains 710 is illustrated. Measurement area 150a may rely heavily on input trace data from sensor 120a to perform a proper computation, while such computation may not be impacted by input trace data from sensor 120b. Similarly, measurement area 150b may rely heavily on input trace data from sensor 120b to perform a proper computation, while such computation may not be impacted by input trace data from sensor 120a. Thus, there is little or no need to pass input trace data from sensor 120a to the node computing an output trace for measurement area 150b, nor to pass input trace data from sensor 120b to the node computing an output trace for measurement area 150a. Accordingly, the dataset (represented by all trace input data associated with the squares) can be segregated or divided as necessary.

The segregation or division may include identifying a group of trace outputs (represented as the circles within areas 820, 840) that will be assigned to nodes within a chain 710 of nodes. For example, in one embodiment, trace data from sensors within a particular distance from a location may be assigned to a particular chain 710. Then, all input trace data (again represented by the squares) that is relevant to the identified nodes is assembled into a data section. Thus, for example, for nodes within area 820, the data section may include all input trace data within area 830. Alternatively, for nodes within area 840, the data section may include all input trace data within area 850. These respective data sections are then assigned to node chains 710.

A particular application can be installed on all nodes in a processing cluster. Such an application can be, for example, the seismic imaging application. The software can include a master piece for installation on master node 430 and a slave piece for installation on sub-nodes 440. When the software is installed, the system administrator builds a table that describes the configuration of the processing cluster. Such a table can include a listing for each available node. The node listing can include, but is not limited to identification and specification information for each node. For example, the listing may contain node name, type of work station, operating system and version, number of processors, Mbytes of memory, relative processor speed, and executable type for an application. This information is used to configured a balanced topology based on a given job.

A job can then be started on master node 430 of the processing cluster. The only thing unique about the master node is that it is the node that must have access to the data on disk, since it becomes an originating data server. The master node then reads the job parameter file, identifies nodes to be used, and configures the proper topology to complete the job. As the node table identifies the executable for each node, the master node can copy the proper executable to the various nodes and start the processing on the individual nodes. Processing then waits for input trace data to be passed to it by its upstream neighbor.

In one particular embodiment, all of the nodes in the processing cluster run some kind of Unix operating system. For example, the various nodes may run Linux, Sun OS, or SGI's Irix. As such, communication between all of the nodes can be via the TCPIP protocol. In such a case, for each connection between nodes a TCPIP socket is opened. This socket is then a point-to-point communication channel between two specific nodes. For each pair of nodes that need to communicate with each other, a socket is opened. So there can be a socket between each sub-node and the master node, a socket to get a dataset on the chain from an upstream neighbor, and a socket to pass the dataset on the chain to the downstream neighbor.

There are two basic internal data formats for Unix computers. One is called big endian, the other little endian. These formats are the way floating point numbers, integers and characters are represented inside the computer memory. Since this is a heterogeneous environment, different data representations may exist within the processing cluster. Therefore, before data is passed along the socket to another node, the data format may need to be converted. In one particular embodiment, all data is transferred using the little endian format. If the receiving node implements little endian format, no conversion is necessary, however, if it is big endian, then it will need to convert data when it receives it and before it sends it. In some instances, the conversion process is simple, and adds very little overhead to the overall system load.

In some embodiments, the middleware commonly found in a processing environment is eliminated. Using simple sockets as the communication and message passing protocol, the imaging software eliminates the need for the operating system to be homogeneous. Since all forms of Unix and Linux support such sockets, varieties of systems within a single cluster can be intermixed. This means that a thirty-two processor SGI computer can be clustered with one-hundred dual Intel systems and one-hundred Sun systems. This allows companies to buy the most cost effective computers at any given time, without regard for what systems they may already own.

Since so many nodes can now be used on a single job, the imaging software can include an automatic restart capability, so the job (or a specific node) will restart itself in the event a node fails. These innovations to the standard imaging algorithm make it possible to use the processing cluster as a single compute platform. They increase the scalability, stability and flexibility of the processing cluster. At the same time they reduce the need for human intervention by eliminating the need to copy data around the network, and manually recover failed jobs due to the problems with NFS.

Figure 9:
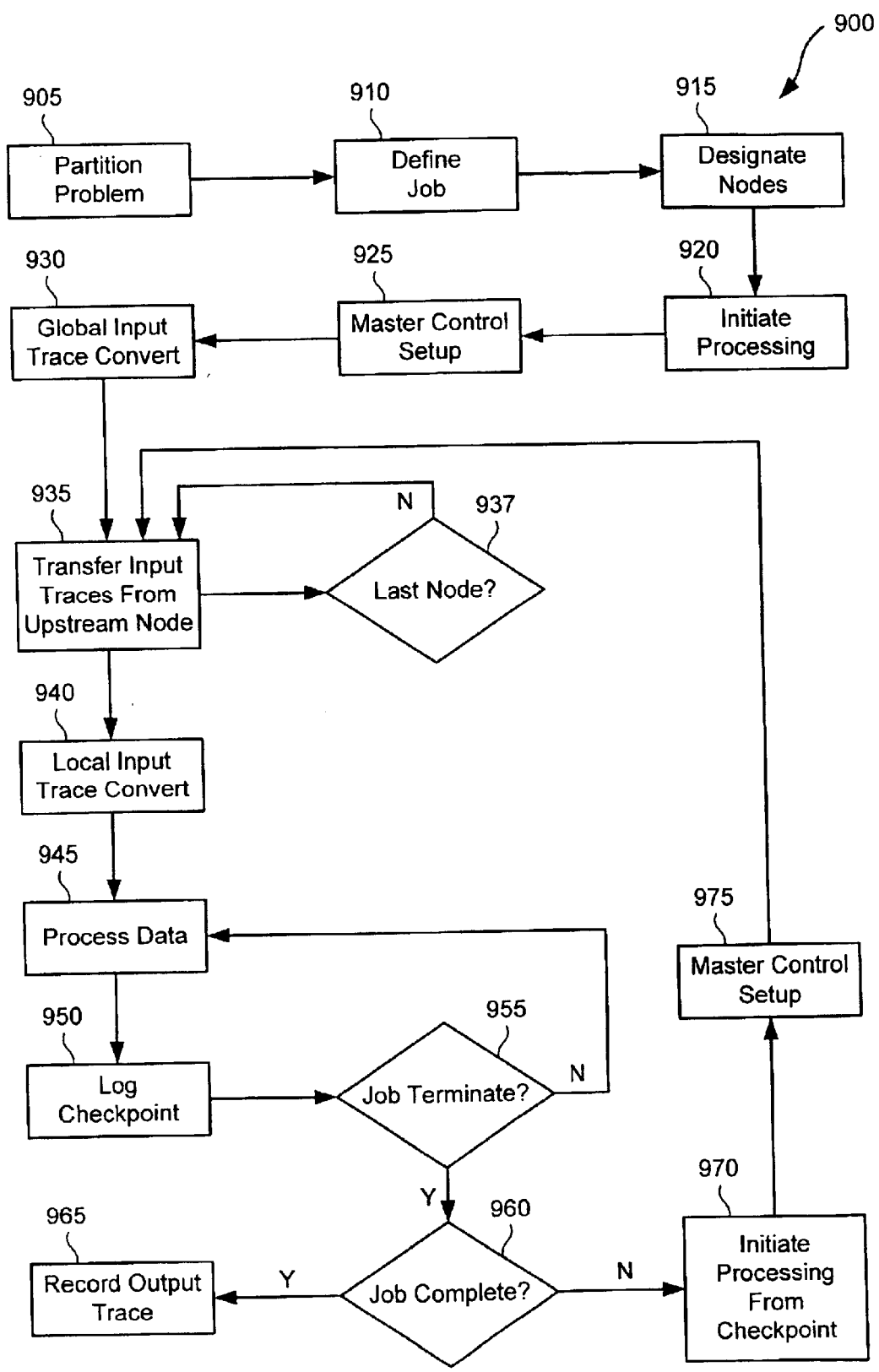
FIG. 9 is a flow diagram of a method in accordance with the present invention.

Referring to FIG. 9, a flow diagram 900 illustrating a method in accordance with the present invention is illustrated. Following flow diagram 900, a problem is partitioned (block 905). Such partitioning can include any processing or operations performed to make one or more discrete jobs. For example, partitioning can include segregating a dataset into two or more data sections for computation on distinct node chains. The discrete jobs are then defined (block 910). Defining the jobs can include identifying processing restraints such as time to complete, maximum number of nodes to be used, and the like. For example, a job may be assigned a group of nodes identified in a node list that can be used to complete the job. The nodes to be used are then designated (block 915). This can include, for example, assigning computation of an output trace associated with a particular measurement area to a node. Further, this can include arranging the various nodes into a chain or star-chain topology tailored to the particular job(s).

In one particular case, the master node attempts to connect to all the sub-nodes designated for the job. The master node then compares how many nodes it successfully connected to the number desired to complete the job. If the number of successfully connected nodes is below a minimum threshold, the job aborts. Otherwise the master node goes to the next step. The master node then goes through the list of connected nodes, and tells each node which node it will get data from (the receiving pair), and which node it will send data to (the sending pair). As the master node identifies these pairs, the pairs set up sockets between themselves. Since the master node has already identified the live nodes, it is reasonably certain that these paired connections can be made. If any fail, the job will abort. The last node in the chain does not send the data to another node. From a computer science point of view, there really is no limit to how long the chain can be. In a particular embodiment operating a seismic imaging algorithm, it has been determined that there is a practical limit of about 300 processors distributed over a number of nodes. As one skilled in the art will appreciate, some of the node may incorporate a plurality of processors.

Where the problem has been partitioned, a chain for each of the partitioned data sections is defined as previously discussed. If two or more chains are needed then the master node divides the nodes into two or more groups, and creates two or more chains from the groups. The first member of each of the chains will get its data from the master, or server. Each chain is then built in the same way as the single chain. Each node knows where it gets its data, and where it then sends the data.

In some cases, as part of node designation, the work to be performed across the various nodes of a processing cluster is balanced. Such balancing can include assigning the computation of output traces to various nodes such that each node within a processing cluster will complete processing in approximately the same amount of time. This limits time wasted as nodes go unused while they await the completion of other nodes in the processing cluster. In the case of a seismic imaging application, the output of a job typically consists of a number of output trace locations (represented as circles in FIG. 3) that sit on an Cartesian coordinate grid. The output space typically forms a rectangle of inlines, and crosslines, where the inlines numbers increase along the y-axis and the crossline numbers increase along the x-axis.

To balance the work that each node is assigned, the master node can assign an output location in a round robin kind of way. That is, node0 gets the first output trace, node1 the second, and so on until we get back to node0 again. This is how the output space would be assigned if the nodes were all the same speed. However, all nodes may not be the same speed.

The node database has an entry for each node describing its relative speed. Nodes that are faster get assigned more output traces, proportional to their speed. So if a node is twice as fast as the other nodes in the job, it will get assigned two traces every time its turn comes up in the round robin assignment process. If a node is only slightly faster than the other nodes in the job, then sometimes it will get an extra trace, and sometimes not. In the end the idea is for the nodes to be assigned work, proportional to the speed of the processor.

With the nodes thus designated, processing is initiated (block 920). Initiating processing (block 920), and master control setup (block 925) may include loading a job parameter file from the master node to each sub-node including a designation of the output desired, the application to be run, the location from which data is received, the location to which data is provided, and the location to which outputs are sent. A dataset for a particular chain of nodes is accessed from a database by the master node. If necessary, the dataset is converted to a defined global type, such as big endian (block 930). The data set is then transferred from the master node to the first node in the chain (block 935). This transfer process from an upstream node to the downstream neighbor node is continued until the dataset is transferred to each node in a chain (block 937). The data set is converted where necessary by each node to a local data type, such as little endian (block 940). The data is processed (block 945), and various checkpoints are recorded during the processing (block 950). As one skilled in the art will appreciate, each node can convert the data type (block 940) and begin processing the data (block 945) at the same time or near the same time it transfers data to the next node (block 937). This is shown in FIG. 9 as parallel paths at block 935. One path goes to block 937 (check if trace data is at last node) while the other path proceeds to block 940 (convert trace data).

The nature of the chain topology can require that all nodes of the chain stay alive for the duration of the job. Since jobs can run for many days, or even weeks, and since computers and networks have problems from time to time, an accommodation has to be made to allow jobs to continue, if there is a hardware failure. Rather than reconfigure the chain, the job can be stopped, and then restarted with the remaining available systems. On the master node there is a thread that wakes up periodically and looks at a trace counter. If the trace counter has failed to advance within a relatively long time period, then the master node concludes that the job has improperly terminated due to some hardware problem. At that point it aborts the running processes on all the nodes, and allows the job to automatically restart itself (blocks 960–970).

Automatic job restarting is accomplished as follows. When the program start command is executed, a monitor program is started. The monitor forks a shell that then starts the executable that the user wants to run. When the executable stops, for whatever reason, control returns back to the monitor. The monitor then checks to see if the job completed successfully, if it did, then the monitor exits and the job is complete. If it did not complete successfully, the monitor restarts the stopped program.

When a stopped job resumes, it can be very inefficient for the job to have to start again from the beginning. To avoid this inefficiency, the software does check-pointing (block 950) on a periodic basis. The user can select the checkpoint interval in hours, depending on the length of the job, or the user can select the checkpoint interval based on the number of traces processed (e.g., checkpoint after processing X-number of traces). The program will dump its output data to the master node (or another node in the chain), or data server at the time interval the user has requested. This saves the results generated to this particular point in the processing, and if a failure occurs, the job will restart itself back at the last checkpoint. Thus, the most the user might lose is the processing time between checkpoints. Check-pointing can be expensive, so the user does not want to make the interval too short.

To minimize the cost of check-pointing, the process can be broken into two steps. The first step runs relatively quickly, and causes the processing in the cluster to pause. The second step takes quite a bit longer, but it runs in the background and allows processing to continue while it finishes. A checkpoint is complete when both steps are complete.

The first step consists of doing a quick dump of the traces from the nodes in the processing cluster to the master, or data server. These traces are dumped one node at a time, and just put on disk in sequential order in a temporary file. After all the compute nodes have dumped their data to disk, they resume processing, and a thread on the master wakes up and begins summing the traces from the temporary file, into the final output file. In the case where the algorithm is a summation process, each time a checkpoint is done, traces can be summed into the matching trace in the final output file. To sum the temporary file into the final output file, the trace from the temporary file is read, its location in the final output file is found, the trace from the final output file is read, the two traces are summed, and the summed trace is written back into the final output file. This is done for each trace in the temporary file. This can take several times longer than the simple dump of the data from the compute nodes, because we are summing two files together, and accessing one of the files in the pseudo random manner.

In the header of each output trace is recorded the number of the last input trace that successfully summed into the output trace. When a job is restarted the monitor program sets a flag on the argument list that indicates that this job is a restarted job. The program then looks in the headers of the output traces, and gets the lowest trace number it finds. This then becomes the starting location for the restarted job.

It is possible that a job may stop while the check-pointing process is under way. This is why every output trace is marked with the last input trace summed into the output trace. In this way, the output trace may indicate a different starting point. When the restarted job gets to the next checkpoint, the program verifies that the output trace needs to have the current set of input traces summed into the output trace, and skips those that indicate no summation is necessary.

This process of automatic check-pointing raises the odds considerably that a job will finish, once it is started. The most likely event that will cause the job to stop altogether is if the master node suffers a failure. In this case the job will have to be manually restarted, since the monitor process will have improperly terminated when the master node failed. Once a job is complete (block 960), the resulting output trace from each of the nodes is updated to the master node that stores it in memory (block 965).

A job may be stopped by the user, and then restarted with a different cluster configuration. This is done by the user stopping, rather than aborting the job. When the user stops the job, an immediate checkpoint is started. When the checkpoint is complete the user can manually restart the program with a different cluster configuration. Alternatively, a portion of a job running on one or more nodes can be stopped, either voluntarily or through an error, and that portion of the job can be moved to an alternative node(s).

The immediate checkpoint is done in the following manner. When the user selects the stop option, the stop program sends a signal to the running job. The signal is caught by the running job, and is interpreted to mean a checkpoint should be started. Once the checkpoint is complete, the job stops as successfully completed, making sure it does not automatically restart. The user can then manually restart the program after selecting a new set of nodes for the job.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A processing cluster for executing a distributed processing operation on a large dataset, wherein multiple processing platforms perform separate, coordinated processing steps relative to portions of the dataset so as to collectively execute the distributed processing operation, the processing cluster comprising:
    a database comprising said dataset;
    a first node, associated with a first processing platform, communicably coupled to the database;
    a second node, associated with a second processing platform, communicably coupled to the first node, wherein the second node is configured to receive at least a first portion of the dataset from the first node via a first communication channel between said first node and said second node; and
    a third node, associated with a third processing platform, communicably coupled to the second node, wherein the third node is configured to receive at least a second portion of the dataset from the second node via a second communication channel between said second node and said third node;
    said first, second and third processing platforms thereby being operative for serial transfer of data of said dataset therebetween via said first and second communication channels free from direct transfer of data from said database to either of said second and third nodes;
    wherein said first, second and third platforms are operative for executing respective first, second and third separate, coordinated processing steps of said distributed processing operation for said large dataset.

2. The processing cluster of claim 1, wherein the second node is communicably coupled to the first node, and the third node is communicably coupled to the second node via a network switch.

3. The processing cluster of claim 2, wherein the third node is further communicably coupled to the first node via the network switch.

4. The processing cluster of claim 1, wherein the dataset comprises a first data section and a second data section, and wherein the second node is configured to receive the first data section from the first node, the processing cluster further comprising:
    a fourth node communicably coupled to the first node, wherein the fourth node is configured to receive the second data section from the first node; and
    a fifth node communicably coupled to the fourth node, wherein the fifth node is configured to receive at least a portion of the second data section from the fourth node.

5. The processing cluster of claim 1, wherein the first node comprises a computer readable medium, and wherein the computer readable medium includes:
    instructions executable by the first node to determine if the second node and the third node terminate properly.

6. The processing cluster of claim 5, wherein the computer readable medium further includes:
    instructions executable by the first node to identify a processing checkpoint of the second node; and
    instructions to restart the second node to processing check-point.

7. The processing cluster of claim 1, wherein the first node comprises a computer readable medium, and wherein the computer readable medium includes:
    instructions executable by the first node to convert at least a portion of the dataset to a global type.

8. The processing cluster of claim 7, wherein the computer readable medium is a first computer readable medium, wherein the second node comprises a second computer readable medium, and wherein the second computer readable medium includes:
    instructions executable by the second node to convert at least a portion of the dataset to a local type.

9. The processing cluster of claim 1, wherein the processing cluster comprises heterogeneous nodes.

10. The processing cluster of claim 9, wherein the first node is a workstation, and the second node is a personal computer.

11. The processing cluster of claim 1, wherein the dataset comprises input seismic trace data, and wherein the second node is configured to create an image of a first region based at least in part on the input seismic trace data, and the third node is configured to create an image of a second region based at least in part on the input seismic trace data.

12. A data processing system, the system comprising:
    a database comprising input data;
    a master node communicably coupled to a chain of at least two sub-nodes, wherein the chain of at least two sub-nodes includes at least one sub-node configured to receive the input data from a preceding sub-node such that said master node, said one sub-node and said preceding sub-node are operative for serial transfer of said input data therebetween free from direct transfer of said input data between said master node and said at least one sub-node;
    wherein said preceding sub-node and said at least one sub-node are operative for executing respective first and second separate, coordinated processing steps of a distributed processing operation with respect to said input data.

13. The system of claim 12, wherein the chain of at least two sub-nodes is a first chain, and wherein the master node is communicably coupled lo a second chain of at least two sub-nodes.

14. A seismic data processing cluster for executing a distributed processing operation on a large dataset, wherein multiple processing platforms perform separate, coordinated processing steps relative to portions of the dataset so as to collectively execute the distributed processing operation, the processing cluster comprising:

a database comprising said dataset of input seismic trace data;

a first node, associated with a first processing platform, communicably coupled to the database;

a second node, associated with a second processing platform, communicably coupled to the first node, wherein the second node is configured to receive at least a first portion of the dataset from the first node via a first communication channel between said first node and said second node; and a third node, associated with a third processing platform, communicably coupled to the second node, wherein the third node is configured to receive at least a second portion of the dataset from the second node via a second communication channel between said second node and said third node;

said first, second and third processing platforms thereby being operative for serial transfer of data of said dataset therebetween via said first and second communication channels free from direct transfer of data from said database to either of said second and third nodes;

wherein said first, second and third platforms are operative for executing respective first, second and third separate, coordinated processing steps of said distributed processing operation for said large dataset.

15. The seismic data processing cluster of claim 14, wherein the second node is communicably coupled to the first node, and the third node is communicably coupled to the second node via a network switch.

16. The seismic data processing cluster of claim 15, wherein the third node is further communicably coupled to the first node via the network switch.

17. The seismic data processing cluster of claim 14, wherein the dataset comprises a first data section and a second data section, and wherein the second node is configured to receive the first data section from the first node, the processing cluster further comprising:

a fourth node communicably coupled to the first node, wherein the fourth node is configured to receive the second data section from the first node; and a fifth node communicably coupled to the fourth node, wherein the fifth node is configured to receive at least a portion of the second data section from the fourth node.

18. The seismic data processing cluster of claim 14, wherein the first node comprises a computer readable medium, and wherein the computer readable medium includes:

instructions executable by the first node to determine if the second node and the third node terminate properly.

19. The seismic data processing cluster of claim 18, wherein the computer readable medium further includes:

instructions executable by the first node to identify a processing checkpoint of the second node; and instructions to restart the second node at the processing check-point.

20. The seismic data processing cluster of claim 14, wherein the first node comprises a computer readable medium, and wherein the computer readable medium includes:

instructions executable by the first node to convert at least a portion of the dataset to a global type.

21. The seismic data processing cluster of claim 20, wherein the computer readable medium is a first computer readable medium, wherein the second node comprises a second computer readable medium, and wherein the second computer readable medium includes:

instructions executable by the second node to convert at least a portion of the dataset to a local type.

22. The seismic data processing cluster of claim 14, wherein the processing cluster comprises heterogeneous nodes.

23. The seismic data processing cluster of claim 22, wherein the first node is a workstation, and the second node is a personal computer.

24. The seismic data processing cluster of claim 14, wherein the second node is configured to create an image of a first region based at least in part on the input seismic trace data, and the third node is configured to create an image of a second region based at least in part on the input seismic trace data.

25. A seismic data imaging system, the system comprising:

a database comprising input seismic trace data;

a master node communicably coupled to a chain of at least two sub-nodes, wherein the chain of at least two sub-nodes includes at least one sub-node configured to receive the input seismic trace data from a preceding sub-node such that said master node, said one sub-node and said preceding sub-node are operative for serial transfer of said input data therebetween free from direct transfer of said input data between said master node and said at least one sub-node;

wherein said preceding sub-node and said at least one sub-node are operative for executing respective first and second separate, coordinated processing steps of a distributed processing operation with respect so said input data.

26. The system of claim 25, wherein the chain of at least two sub-nodes is a first chain, and wherein the master node is communicably coupled to a second chain of at least two sub-nodes.

27. A computer readable medium, the computer readable medium comprising computer executable instructions to:

receive input seismic data from an upstream node, wherein the upstream node is one of a chain of nodes serially communicably coupled to a master node such that said data is obtained from said upstream node free from direct transfer of data from said master node independent of said upstream node;

compute an image of a physical location based at least in part on the input seismic data; and provide a first output, wherein said first output is combined with a second output of said upstream node to yield a composite result based on a distributed processing operation performed on said input seismic data.

28. The computer readable medium of claim 27, wherein the computer readable medium further comprises computer executable instructions to:

monitor a termination characteristic of a downstream node, wherein the downstream node is one of the chain of nodes.

29. The computer readable medium of claim 28, wherein the compute, readable medium further comprises computer executable instructions to:

identify a check-point of the downstream node; and restart the downstream node at the check-point.

30. The computer readable medium of claim 27, wherein the computer readable medium further comprises computer executable instructions to:
  convert the input seismic data to a global type.

31. The computer readable medium of claim 27, wherein the computer, readable medium further comprises computer executable instructions to:
  convert the input seismic data to a local type.

32. The computer readable medium of claim 27, wherein the computer readable medium further comprises computer executable instructions to:
  receive job parameters; and
  transfer the image to the master node.

33. A computer readable medium, the computer readable medium comprising computer executable instructions to:
  access an output trace file, wherein the output trace file identifies a plurality of output seismic traces to be computed;
  access a node file, wherein the node file includes an attribute about each node in a chain of nodes; and
  assign each of the plurality of output seismic traces to a node in the chain of nodes, wherein computation of each of the plurality of output seismic traces on the assigned nodes completes within a balanced time.

34. The computer readable medium of claim 33, the computer readable medium further comprising computer executable instructions to:
  determine a time required to compute an output trace selected from the plurality of output traces on a node selected from the chain of nodes.

35. The computer readable medium of claim 33, the computer readable medium further comprising computer executable instructions to:
  monitor computation of an output trace on an assigned node.

36. The computer readable medium of claim 35, the computer readable medium further comprising computer executable instructions to:
  identify a check-point of the assigned node; and
  restart the assigned node at the check-point.

37. The computer readable medium of claim 33, the computer readable medium further comprising computer executable instructions to:
  receive the computed output traces from the respective assigned nodes.

38. The computer readable medium of claim 33, wherein the plurality of output traces is a first plurality of output traces, wherein the chain of nodes is a first chain of nodes, and wherein the first plurality of output traces is a subset of a group of output traces, the computer readable medium further comprising computer executable instructions to:
  segregate the group of output traces into at least the first plurality of output traces and a second plurality of output traces;
  access an output trace file, wherein the output trace file identifies a plurality of output traces to be computed;
  access a node file, wherein the node file includes an attribute about each node in a chain of nodes; and
  assign each of the second plurality of output traces to a node in a second chain of nodes.

39. A method of computing, the method comprising:
  accessing a dataset;
  designating a plurality of nodes as a node chain, wherein the node chain comprises a first node, a second node, and a third node;
  serially transferring the dataset from the first node to the second node, and from the second node to the third node such that said third node receives said dataset substantially free from direct communication between said first node and said third node;
  processing the dataset on the first node to create a first output, on the second node to create a second output, and on the third node to create a third output; and
  assembling the first, second and third outputs to form a coherent output.

40. The method of claim 39, wherein the coherent output is an image of a geologic structure.

41. A method for use in controlling a distributed processing operation for processing seismic data to yield geologic information regarding a subterranean geologic formation, said distributed processing operation involving execution, on multiple platforms, of separated, coordinated processing steps with respect to a common processing job, said method comprising the steps of:
  monitoring said distributed processing operation for processing seismic data to identify a malfunction;
  identifying a portion of said processing job affected by said malfunction; and
  automatically re-tasking at least one processing platform substantially free from any concurrent prompts by a human operator related to said re-tasking, so as to complete said portion of said processing job.

42. A method as set forth in claim 41, wherein said step of monitoring comprises identifying a lack of progress towards completion of said portion of said job.

43. A method as set forth in claim 41, wherein said step of identifying comprises identifying at least one malfunctioning processing platform associated with said malfunction.

44. A method as set forth in claim 43, wherein said step of re-tasking comprises designating at least one processing platform other than said malfunctioning platform to execute said portion of said job.

45. A method as set forth in claim 41, wherein said step of re-tasking comprises automatically restarting said portion of said job substantially free from any concurrent prompt from a human operator related to said restarting.

46. A method as set forth in claim 45, wherein said job is divided into a number of sections separated by check-points, and said step of restarting comprises initiating execution of said portion of said job at a last one of said check-points successfully reached.

47. A method as set forth in claim 41, wherein said distributed processing operation involves a serial data transfer wherein each of a number of processing platforms is assigned to receive data from a designated upstream node and to transmit data to a designated downstream node, and said step of re-tasking comprises changing a designation of one of an upstream node and a downstream node for at least one of said number of processing platforms.

48. A method for use in implementing a distributed processing operation for processing seismic data to yield geologic information regarding a subterranean geologic formation, wherein the seismic data includes data corresponding to a number of traces where each trace reflects a seismic signal received at a sensor location, said method comprising the steps of:
  providing a cluster of processing platforms for executing said distributed processing operation, wherein said processing platforms execute separate, coordinated processing steps so as to collectively yield said geologic information;

establishing a first data type for a transfer of data from a first processing platform to a second processing platform of said cluster of processing platforms, wherein said first data type relates to the way that data is represented within a content of said transfer; and operating said second processing platform to convert said content of said transfer from said first data type to a second data type different than said first data type;

wherein said seismic data is processed in a distributed processing environment involving heterogeneous processing platforms.

49. A method as set forth in claim 48, further comprising the steps of running a first operating system on said first processing platform and running a second operating system, different than said first operating system, on said second processing platform.

50. A method as set forth in claim 48, wherein said first data type reflects a big endian format and said second data type reflects a little endian format.

51. An apparatus for use in controlling a distributed processing operation for processing seismic data to yield geologic information regarding a subterranean geologic formation, said distributed processing operation involving execution, on multiple platforms, of separated, coordinated processing steps with respect to a common processing job, said apparatus comprising the steps of:

a monitoring module for monitoring said distributed processing operation for processing seismic data to identify a malfunction and a portion of said processing job affected by said malfunction; and a re-tasking module for automatically re-tasking at least one processing platform of said multiple processing platforms substantially free from any concurrent prompts by a human operator related to said re-tasking, so as to complete said portion of said processing job.

52. An apparatus as set forth in claim 51, wherein said monitoring module is further operative for identifying a lack of progress towards completion of said portion of said job.

53. An apparatus as set forth in claim 51, wherein said monitoring module is further operative for identifying at least one malfunctioning processing platform associated with said malfunction.

54. An apparatus as set forth in claim 53, wherein said re-tasking module is operative for designating at least one processing platform other than said malfunctioning platform to execute said portion of said job.

55. An apparatus as set forth in claim 51, wherein said re-tasking module is further operative for automatically restarting said portion of said job substantially free from any concurrent prompt from a human operator related to said starting.

56. An apparatus as set forth in claim 55, wherein said job is divided into a number of sections separated by check-points, and said restarting module is operative for initiating execution of said portion of said job at a last one of said check-points successfully reached.

57. An apparatus as set forth in claim 51, wherein said distributed processing operation involves a serial data transfer wherein each of a number of processing platforms is assigned to receive data from a designated upstream node and to transmit data to a designated downstream node, and said re-tasking module is operative for changing a designation of one of an upstream node and a downstream node for at least one of said number of processing platforms.

58. An apparatus for use implementing a distributed processing operation for processing seismic data to yield geologic information regarding a subterranean geologic formation, wherein the seismic data includes data corresponding to a number of traces where each trace reflects a seismic signal received at a sensor location, said apparatus comprising:

a cluster of processing platforms configured for executing said distributed processing operation, wherein said processing platforms execute separate, coordinated processing steps so as to collectively yield said geologic information, wherein said cluster is configured to establish a first data type for transfer of data from a first processing platform to a second processing platform of said cluster of processing platforms, said first data type relating to the way that data is represented within a content of said transfer;

said second processing platform being operative to convert said content of said transfer from said first data type to a second data type different than said first data type, wherein said seismic data is processed in a distributed processing environment involving heterogeneous platforms.

59. An apparatus as set forth in claim 58, wherein said first processing platform is operative for running a first operating system and said second processing platform is operative for running a second operating system different than said first operating system.

60. An apparatus as set forth in claim 58, wherein said first data type reflects a big endian format and said second data type reflects a little endian format.

61. A processing cluster for executing a distributed processing operation on a large dataset of seismic data, wherein multiple processing platforms perform separate, coordinated processing steps relative to portions of the dataset so as to collectively execute the distributed processing operation, the processing cluster comprising:

a database comprising said dataset of seismic data;

a first node, associated with a first processing platform, communicably coupled to the database;

a second node, associated with a second processing platform, communicably coupled to the first node, wherein the second node is configured to receive at least a first portion of the dataset of seismic data from the first node via a first communication channel between said first node and said second node; and a third node, associated with a third processing platform, communicably coupled to the second node, wherein the third node is configured to receive at least a second portion of the dataset of seismic data from the second node via a second communication channel between said second node and said third node;

said first, second and third processing platforms thereby being operative for serial transfer of data of said dataset of seismic data therebetween via said first and second communication channels free from direct transfer of data from said database to either of said second and third nodes;

wherein said first, second and third platforms are operative for executing respective first, second and third separate, coordinated processing steps of said distributed processing operation for said dataset of seismic data;

wherein said first node and second node are configured for transfer of data of a first data type therebetween, said first data type relating to the way that data is represented within a content of said transfer; and said second node is operative to convert said content of said transfer from said first data type to a second data type different than said first data type, wherein said seismic data is processed in a distributed processing environment involving heterogeneous platforms.

62. A processing cluster for executing a distributed processing operation on a large dataset of seismic data, wherein multiple processing platforms perform separate, coordinated processing steps relative to portions of the dataset so as to collectively execute the distributed processing operation, the processing cluster comprising:

a database comprising said dataset of seismic data;

a first node, associated with a first processing platform, communicably coupled to the database;

a second node, associated with a second processing platform, communicably coupled to the first node, wherein the second node is configured to receive at least a first portion of the dataset of seismic data from the first node via a first communication channel between said first node and said second node; and a third node, associated with a third processing platform, communicably coupled to the second node, wherein the third node is configured to receive at least a second portion of the dataset of seismic data from the second node via a second communication channel between said second node and said third node;

said first, second and third processing platforms thereby being operative for serial transfer of data of said dataset of seismic data therebetween via said first and second communication channels free from direct transfer of data from said database to either of said second and third nodes;

wherein said first, second and third platforms are operative for executing respective first, second and third separate, coordinated processing steps of said distributed processing operation for said dataset of seismic data;

a monitoring module for monitoring said distributed processing operation to identify a malfunction and one of said first, second and third nodes affected by said malfunction; and a re-tasking module for automatically re-tasking one of said first, second and third nodes substantially free from any concurrent prompts by a human operator related to said re-tasking.

* * * * *

UNITED STATES PATENT AND TRADEMARK OFFICE
CERTIFICATE OF CORRECTION

PATENT NO.     : 6,915,212 B2
DATED          : July 5, 2005
INVENTOR(S)    : Kamps It is certified that error appears in the above-identified patent and that said Letters Patent is hereby corrected as shown below:

<u>Column 14,</u>
Line 21, delete the second occurrence of "to" and insert therefor -- at the --; and
Line 64, delete "lo", and insert therefor -- to --.

<u>Column 16,</u>
Line 36, delete "so", and insert therefor -- to --; and
Line 65, delete "compute,", and insert therefor -- computer --.

<u>Column 17,</u>
Line 6, delete "computer,", and insert therefor -- computer --.

Signed and Sealed this

Thirteenth Day of September, 2005

JON W. DUDAS
*Director of the United States Patent and Trademark Office*